(12) United States Patent
Yoshinari et al.

(10) Patent No.: US 9,047,920 B2
(45) Date of Patent: Jun. 2, 2015

(54) MULTITRACK RECORDER AND MIXDOWN METHOD

(75) Inventors: Daisuke Yoshinari, Tokyo (JP); Shigeyuki Adachi, Tokyo (JP)

(73) Assignee: TEAC Corporation, Tami-shi, Tokyo (JP)

( * ) Notice: Subject to any disclaimer, the term of this patent is extended or adjusted under 35 U.S.C. 154(b) by 561 days.

(21) Appl. No.: 13/416,939

(22) Filed: Mar. 9, 2012

(65) Prior Publication Data

US 2013/0051207 A1 Feb. 28, 2013

(30) Foreign Application Priority Data

Aug. 29, 2011 (JP) ................................. 2011-185966

(51) Int. Cl.
| | | |
|---|---|---|
| *H04B 1/00* | (2006.01) | |
| *G11B 20/10* | (2006.01) | |
| *H04S 7/00* | (2006.01) | |
| *H04S 1/00* | (2006.01) | |

(52) U.S. Cl.
CPC ............ *G11B 20/10527* (2013.01); *H04S 7/30* (2013.01); *H04S 1/007* (2013.01); *G11B 2020/10574* (2013.01); *G11B 2020/10601* (2013.01)

(58) Field of Classification Search
USPC ........... 381/123, 111, 56, 58; 369/4, 5, 30.05, 369/30.09, 30.19, 47.16, 83, 84; 700/6, 75
See application file for complete search history.

(56) References Cited

U.S. PATENT DOCUMENTS

| | | | | |
|---|---|---|---|---|
| 6,343,054 | B1* | 1/2002 | Maeda | 369/47.32 |
| 7,343,210 | B2* | 3/2008 | DeVito et al. | 700/94 |
| 2002/0045962 | A1* | 4/2002 | Kobayashi | 700/94 |
| 2003/0021049 | A1 | 1/2003 | Sugihara | |
| 2004/0091126 | A1* | 5/2004 | Hirade et al. | 381/119 |
| 2004/0136549 | A1* | 7/2004 | Pennock et al. | 381/119 |

FOREIGN PATENT DOCUMENTS

| | | |
|---|---|---|
| JP | 2560496 B2 | 12/1996 |
| JP | 4003419 B2 | 11/2007 |
| JP | 2011060366 A | 3/2011 |

* cited by examiner

*Primary Examiner* — Vivian Chin
*Assistant Examiner* — Friedrich W Fahnert
(74) *Attorney, Agent, or Firm* — Seed IP Law Group PLLC (57) ABSTRACT

An apparatus and a method for efficiently converting, by means of mixdown, audio signals recorded in multiple tracks into stereo signals.

A plurality of audio signals input from an input terminal are recorded into a plurality of tracks of a recording medium. A mixer reads the audio signals recorded in the multiple tracks, subjects the audio signals to mixdown according to a mixer parameter set by an operation section, and records the processed signals as audio signals in the recording medium without reproducing the processed signal in real time. A plurality of mixer parameters are set, and a user can select a desired mixer parameter.

9 Claims, 6 Drawing Sheets

MULTITRACK RECORDER AND MIXDOWN METHOD

PRIORITY INFORMATION

This application claims priority to Japanese Patent Application No. 2011-185966, filed on Aug. 29, 2011, which is incorporated herein by reference in its entirety.

BACKGROUND OF THE INVENTION

1. Technical Field

The present invention relates to a multitrack recorder and a mixdown method and, more particularly, to a technique for mixing down audio signals recorded in multiple tracks to thus generate stereo signals.

2. Related Art

Hitherto-known techniques include a multitrack recording technique for recording audio signals input from a plurality of input terminals in different tracks and a technique for reproducing audio signals from recorded tracks and mixing down the thus-reproduced audio signals in two tracks, thereby stereophonically recording the audio signals. The technique has been employed at; for instance, a site of music production where music sounds of the drum, the bass instrument, the guitar, and the like, making up a musical composition are respectively recorded indifferent tracks and where a music producer (a mixing engineer) controls a balance among volumes of respective music sounds while taking into account a total balance, thereby finally creating a two-channel stereo musical composition.

JP 2560496 B discloses a technique for automatically setting a state of connection between a mixer and a recorder according to various types of operation forms. The operation forms include operation for initially recording audio signals in at least a virgin medium or an empty medium; operation for recording new input signals in different tracks while reproducing audio signals of recorded tracks; operation for recording audio signals of recorded track without modification in other tracks or recording the audio signals in other tracks while mixing them with new input signals; operation for partially re-recording audio signals belonging to certain segments of recorded tracks; and operation for outputting audio signals of recorded tracks without modification or after mixing the audio signals.

JP 4003419 B discloses a technique for enabling performance of mixdown operation while all music parts are being monitored when mixdown operation for bouncing recording is performed again.

Descriptions of JP 2011-60366 A are directed toward stereo recording during which signals are recorded in multiple tracks simultaneously with being mixed down, to thus generate stereo signals and record the stereo signals into different tracks. During stereo recording, a multitrack-recorded file and a stereo-recorded file are separately created. When only the stereo-recorded sound is required, only the stereo-recorded file is read and reproduced.

Incidentally, when respective audio signals recorded in multiple tracks are reproduced and mixed down in two tracks, to thus be stereophonically recorded, the sound producer reproduces each of the audio signals recorded in multiple tracks in each case and controls a balance while the audio signal is being output, to thus create a two-channel stereo musical composition. Therefore, this raises a problem of consumption of a certain period of time. In the meantime, when a certain musical composition is created by means of mixdown operation, the music produce may have already known that mixdown operation can be carried out with an exiting, known balance, or the like, or that, after a balance is controlled during a few first intervals, mixdown operation can be carried out with the balance being held. Even in such a case, there has been no alternative way but to create a two-channel stereo musical composition while audio signals recorded in multiple tracks are being reproduced and output in much the same way as in the related art, which raises a problem of consumption of dead time.

SUMMARY

The present invention provides an apparatus capable of mixing down audio signals recorded in multiple tracks in two tracks to thereby stereophonically record the audio signals considerably efficiently within a short period of time, as well as providing a mixdown method.

The present invention is characterized by a multitrack recorder comprising: multitrack recording means that records a plurality of audio signals input from an input terminal into different tracks of a recording medium; operation means for commanding that the audio signals recorded in multiple tracks be mixed down by means of a preset parameter to thereby be stereophonically recorded; and mixer means that, when the operation means has issued the command, reads the audio signals recorded in the multiple tracks of the recording medium, mixes down the thus-generated audio signals by use of the preset parameter, to thus generate stereo signals, and records the stereo signals as audio signals in the recording means without reproducing and outputting the stereo signals in real time.

In one embodiment of the present invention, the preset parameter includes parameters showing at least a balance and a sound volume.

In another embodiment of the present invention, the mixer means reads and outputs the stereo signals recorded in the recording means in a middle of mixdown processing.

The present invention also provides a method for mixing down audio signals recorded in multiple tracks, the method comprising: a step of recording audio signals in respective multiple tracks; a step of controlling parameters used in mixdown processing; a step of mixing down the audio signals by means of the controlled parameters; a step of commanding automatic execution; a step of storing into memory parameters employed when automatic execution has been commanded; a step of performing mixdown processing by use of the parameters stored in the memory; and a step of recording stereo signals generated by means of mixdown processing without reproducing the signals in real time.

The present invention also provides a method for mixing down audio signals recorded in multiple tracks, the method comprising a step of recording audio signals in respective multiple tracks; a step of selecting parameters to be used in mixdown processing from memory; a step of commanding automatic execution; a step of performing mixdown processing by use of the selected parameters; and a step of recording and into a recording medium stereo signals generated through mixdown processing without reproducing the stereo signals in real time.

According to the present invention, generated stereo signals are automatically mixed down by means of preset parameters without being reproduced in real time. Hence, audio signals recorded in multiple tracks can be efficiently mixed down in two tracks within a short period of time, to thus be stereophonically recorded.

The invention will be more clearly comprehended by reference to the embodiments provided below. However, the scope of the invention is not limited to the embodiments.

BRIEF DESCRIPTION OF THE DRAWINGS

Preferred embodiments of the present invention will be described in detail by reference to the following drawings, wherein.

DETAILED DESCRIPTION

Embodiments of the present invention are hereunder described by reference to the drawings.

Figure 1:
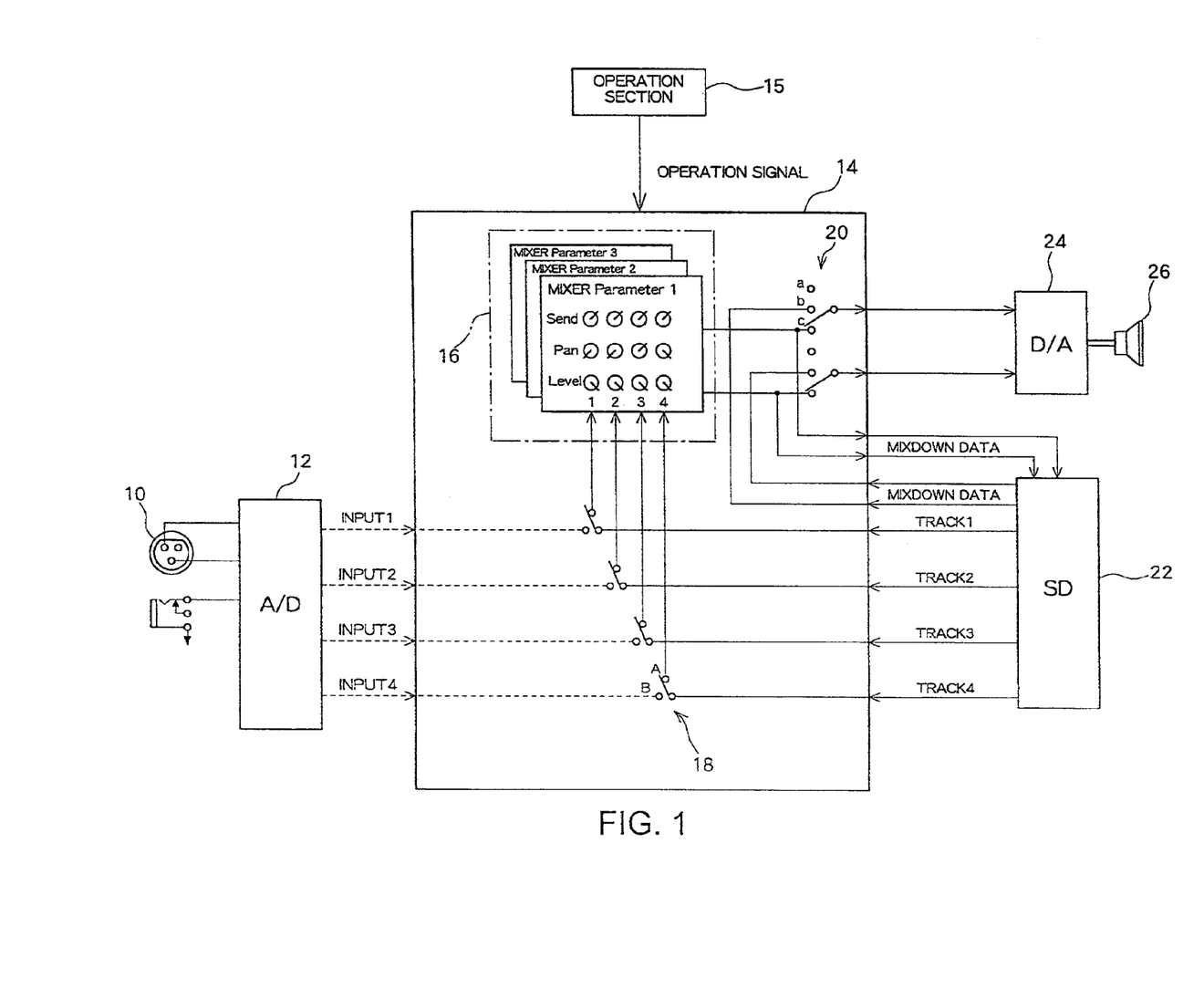
FIG. 1 is a block diagram of a configuration of an embodiment.

FIG. 1 shows a block diagram showing a configuration of a multitrack recorder of an embodiment. The multitrack recorder includes an input terminal 10, an A/D converter 12, a mixer 14, an operation section 15, a recording medium 22 like SD memory, a D/A converter 24, and a speaker 26.

The input terminal 10 receives a plurality of audio signals; for instance, music signals, and outputs the signals to the A/D converter 12.

The A/D converter 12 converts the thus-fed analogue audio signals into digital audio signals and outputs the digital audio signals to the mixer 14. The drawings show a case where a plurality of analogue audio signals are sequentially converted into digital audio signals and where the digital audio signals are output as an INPUT 1 audio signal, an INPUT 2 audio signal, an INPUT 3 audio signal, and an INPUT 4 audio signal. As a matter of course, the four audio signals are illustrative. The number of audio signals may be greater or smaller than four. Since the present embodiment is based on the premise that the audio signals are finally mixed down to two-channel stereo audio signals, three or more analogue audio input signals are required.

The mixer 14 has a CPU 16, a first switch 18, and a second switch 20. The first switch 18 has contact points A and B and switches between feeding digital audio signals from the A/D converter 12 to the recording medium 22 and feeding the digital audio signals read from the recording medium 22 to the CPU 16. Specifically, when the contact point of the first switch 18 is switched to the contact point B, the digital audio signals from the A/D converter 12 is fed to the recording medium 22 and recorded in different tracks of the recording medium 22. When the contact point of the first switch 18 is switched to the contact point A, the digital audio signals recorded in the recording medium 22 are read and fed to the CPU 16.

The operation section 15 corresponds to a switch, a button, or a dial that can be actuated by the user. In addition to toggling on and off power of the multitrack recorder, the operation section 15 toggles on and off a multitrack recording function, a mixdown processing function, a reproducing function, and the like. In addition to having a function of controlling various parameters employed in mixdown processing, the operation section 15 has a function of storing the controlled parameters, the function of selecting any mixed parameter when the controlled parameter is stored in numbers, and a function of automatically performing mixdown processing by means of the thus-selected mixed parameter.

The CPU 16 has memory, like RAM, and mixes down the plurality of supplied digital audio signals; namely, the four digital audio signals TRACK 1, TRACK 2, TRACK 3, and TRACK 4, thereby generating LR 2-channel stereo signals. During mixdown processing, the CPU 16 performs processing by reference to the mixed parameter stored in the memory, like RAM. The mixer parameter is one that sets a value of "Send," a value of "Pan," and a value of "Level" for each of digital audio signals in tracks. "Send" is a parameter for setting whether or not to send digital audio signals to an external effector and subject the signals to effect processing. "Pan" is a parameter for controlling a balance between an L channel and an R channel. "Level" is a parameter for controlling a level of the audio signal. In the drawing, the "Send," "Pan," and "Level" parameters are controlled for each of the audio signals in the four tracks. A plurality of mixer parameters are set like a mixer parameter 1, a mixer parameter 2, a mixer parameter 3, . . . . As mentioned above, each of the mixer parameters is made up of three parameters; namely, "Send," "Pan," and "Level," for each track. Each of the parameters making up the mixer parameter can arbitrarily be controlled as a result of the user operating the operation section 15. For instance, an LR balance of digital audio signals of the TRACK 1 is adjusted by controlling the "Pan" parameter, and the digital audio signal of the TRACK 2 is controlled to a higher or lower level by controlling the "Level" parameter. The user arbitrarily controls the parameters in the course of performance of mixdown processing, whereby mixdown can be performed by means of a desired characteristic. Further, in accordance with an operation signal from the operation section 15, the CPU 16 records a controlled mixer parameter into the memory and performs mixdown processing by use of the thus-recorded mixer parameter. The user, at this time, does not need to control the respective parameters by operating the operation section 15. Stereo signals prepared by means of mixdown of the audio signals are recorded in the recording medium 22.

The second switch 20 has three contact points "a," "b," and "c." When a monitor output is not produced in the middle of execution of mixdown processing, switching to the contact point "a" takes place. Even when a monitor output is produced in the middle of performance of mixdown processing, switching to the contact point "b" takes place. When the input audio signals are recorded in multiple tracks, switching to the contact point "c" takes place.

The D/A converter 24 converts the digital audio signals output from the mixer 14 into analogue audio signals and outputs the analogue audio signals to the speaker 26.

Multitrack recording processing, mixdown processing (that does not produce a monitor output), and mixdown processing (that produces a monitor output) are hereunder described in sequence.

Figure 2:
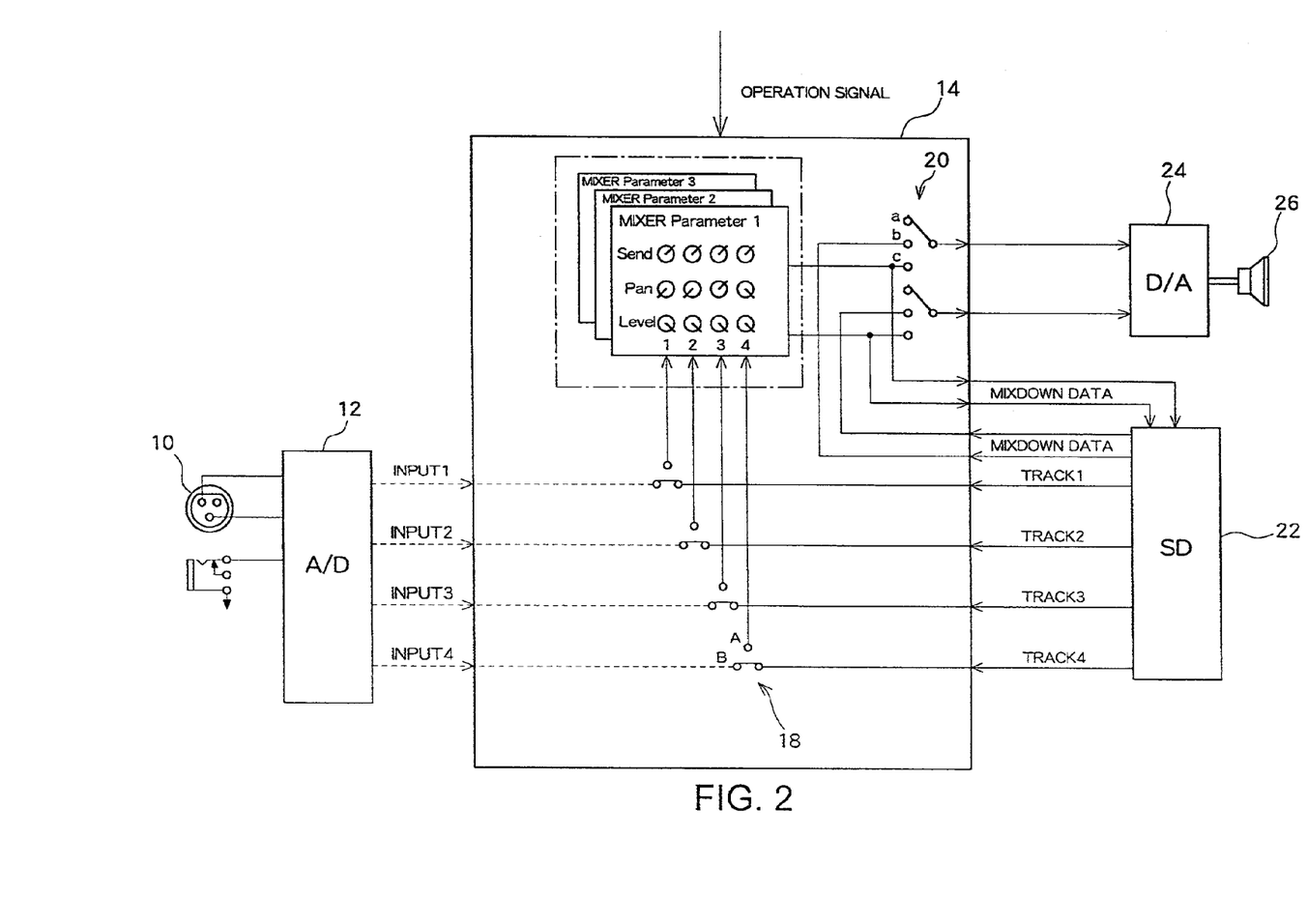
FIG. 2 is an explanatory diagram of operation performed during multitrack recording.

FIG. 2 shows operation performed during multitrack recording processing. When the user sets a current mode to a multitrack recording mode by operating the operation section 15, the operation signal is fed to the CPU 16. In accordance with the operation signal, the CPU 16 switches the first switch 18 to the contact point B. Audio signals input from the input terminal 10 are converted into digital signals by means of the A/D converter 12. According to a (manual or automatic) setting of the input channel, the audio signals are selectively input, as INPUT 1, INPUT 2, INPUT 3, and INPUT 4 input signals, to respective tracks of the recording medium 22. For instance, when players of the drum, the bass instrument, the guitar, and the keyboard record their sounds, recording parts of the music sounds responsible for a rhythm is first commenced. The next player plays a predetermined musical instrument in tune with the rhythm while listening to the music sounds recorded immediately before. The thus-played music sounds are then recorded. Specifically, the drum sound that is a rhythmical sound is first played and then recorded. Subsequently, sounds of the bass instrument sound are recorded in another track while the thus-recorded drum sound is being reproduced. Sounds of the guitar are recorded in still another track while the sounds of the drum and the base instrument are being reproduced. Finally, sounds of the keyboard are recorded in yet another track while the thus-recorded sounds of the drum, bass instrument, and guitar are being reproduced. As mentioned above, different music sounds are recorded in four tracks. When the thus-recorded sounds are reproduced, the CPU 16 reads and reproduces the sounds from the recording medium 22 and outputs the thus-read music sounds from the speaker 26 by means of changing the second switch 20 to the contact point "b." In the drawing, the second switch 20 is held at an OFF position. The setting is based on the premise that the drum sound is first recorded.

When multitrack recording is thus completed, mixdown processing is now performed.

Figure 3:
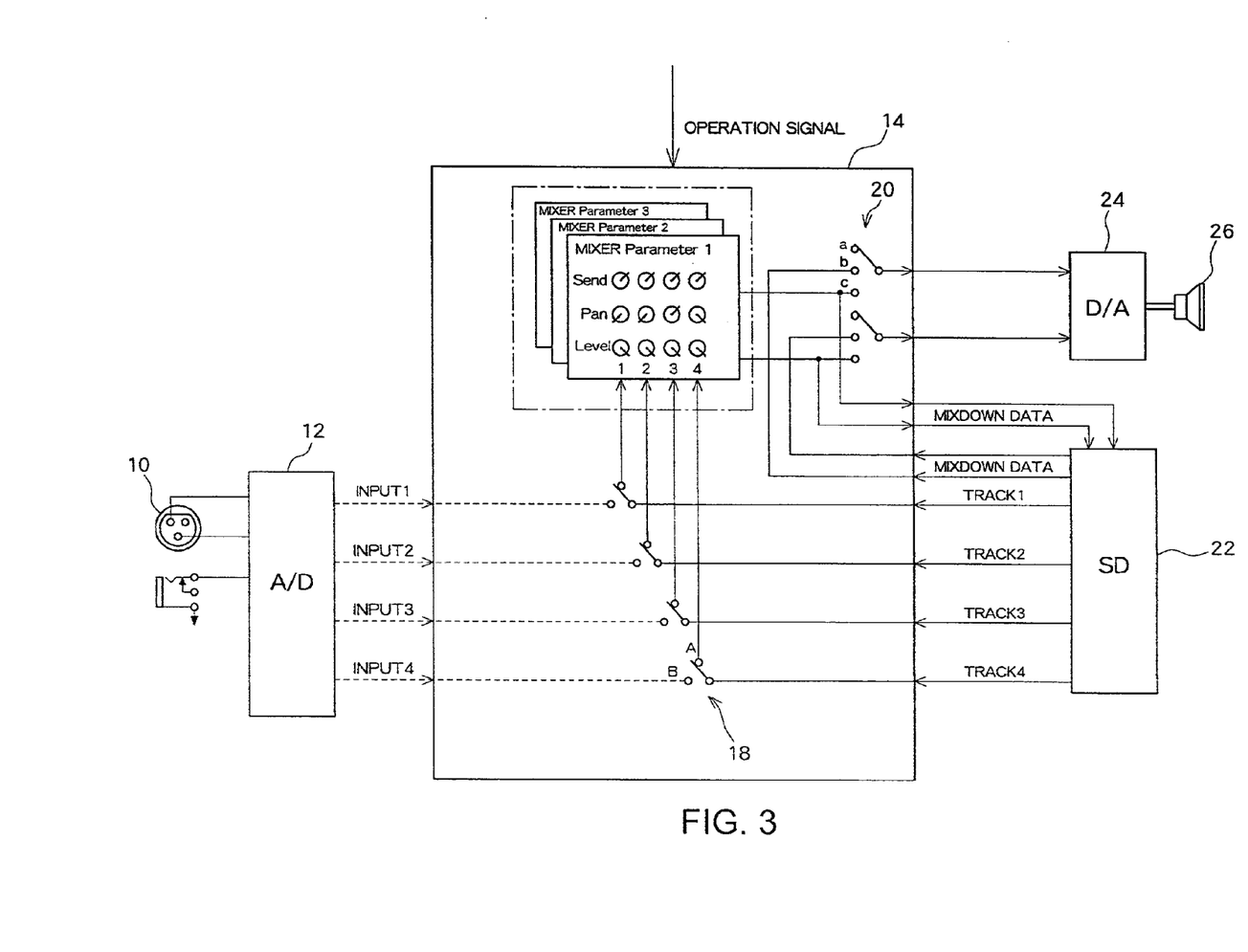
FIG. 3 is an explanatory diagram of operation performed during mixdown.

FIG. 3 shows operation performed during mixdown processing (that does not involve production of a monitor output). When the user sets the mode to the mixdown mode by operating the operation section 15, the operation signal is supplied to the CPU 16. The CPU 16 reads audio signals recorded in four tracks of the recording medium 22 and generates LR stereo signals at sound volumes and with an LR balance that are set by means of the Pan and Level parameters. The thus-produced stereo signals are recorded in the recording medium 22 while being reproduced and output in real time. The user can arbitrarily control the Pan and Level parameters by operation of switches and buttons on the operation section 15. The second switch 20 is switched to the contact point "b." Processing performed in this phase is analogous to related-art mixdown processing.

In the meantime, when the user satisfies the current control and continually carries out mixdown processing by means of the control operation, the user actuates an "automatic execution" button, or the like, of the operation section 15. In response to actuation of the automatic execution button, an operation signal is supplied to the CPU 16. The CPU 16 records the current mixer parameters in memory and reads the mixer parameters and performs mixdown processing from the beginning of the music sounds by use of the mixer parameters. The second switch 20 is switched to the contact point "a" on this occasion, thereby sequentially reading the audio signals recorded in the recording medium 22 and mixing down the thus-read signals. The LR stereo signals produced by processing are again recorded in the recording medium 22. During automatic mixdown processing, processing for reproducing the stereo signals are not performed, and only mixdown processing of music signals is performed. Accordingly, it becomes possible to perform mixdown processing at a faster speed (a speed that is faster than 1× rotation speed), so that a processing time is significantly shortened when compared with a case where mixdown processing is performed by arbitrarily controlling the parameters while the music signals are being reproduced.

Further, when automatically performing mixdown processing by use of a mixer parameter of the past, the user selects a desired mixer parameter from a plurality of mixer parameters 1, 2, 3, ... by operation of the operating section 15. For instance, a mixer parameter including parameters used in mixdown processing performed in the past is previously registered as a mixer parameter 2, and the user selects the mixer parameter 2 by operation of the operating section 15. The CPU 16 reads the mixer parameter 2 from the memory according to an operation signal from the operation section 15 and performs mixdown processing in accordance with each of the Send, Pan, and Level parameters set by the mixer parameter. During automatic execution of mixdown processing, all the user has to do is to operate, at the outset, an automatic execution button by way of the operation section 15 or select a mixer parameter to be used. Subsequently, there is no necessity of operating the operation section 15 until mixdown processing is completed.

Figure 4:
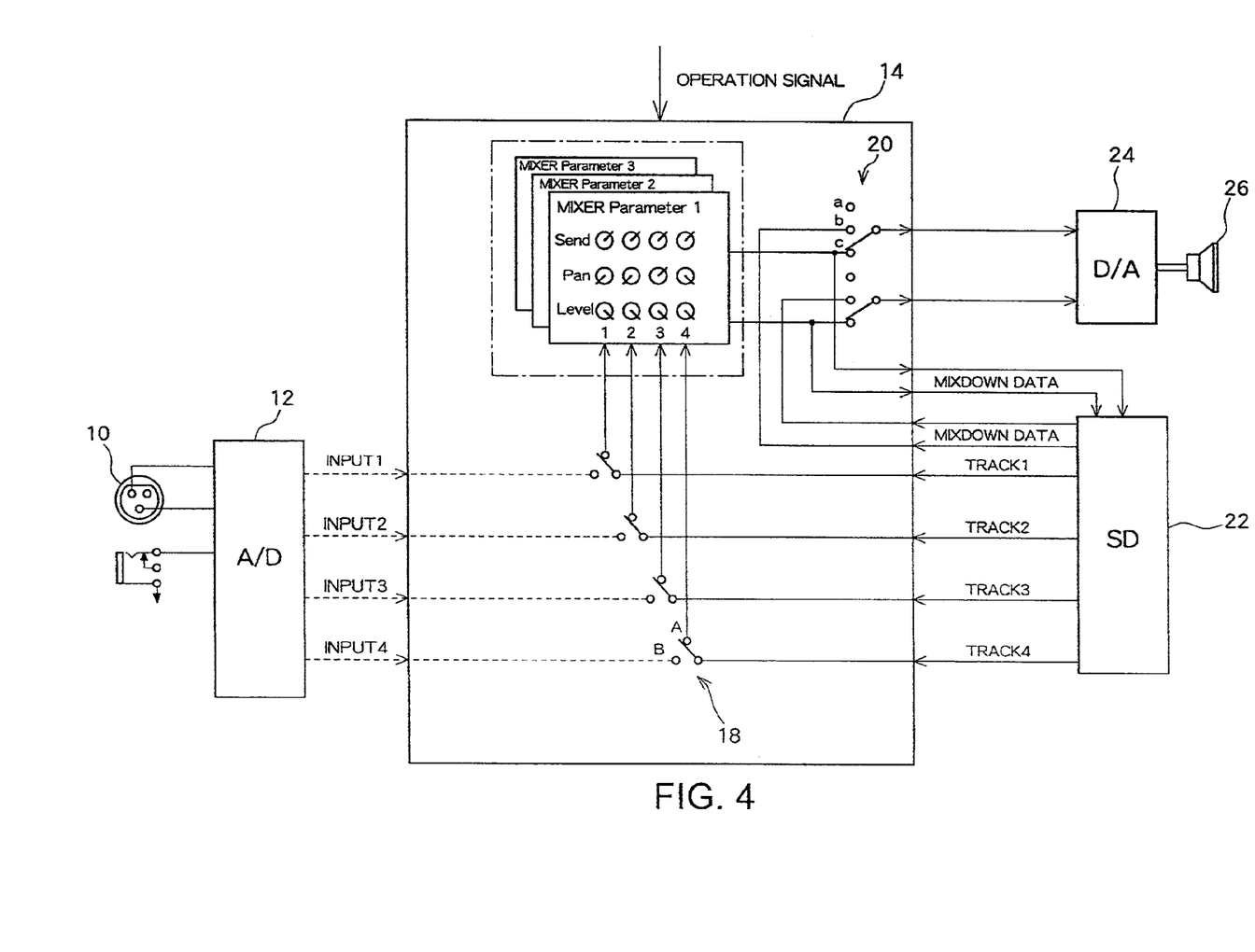
FIG. 4 is another explanatory diagram of operation performed during mixdown.

FIG. 4 shows operation performed during mixdown processing (that involves production of a monitor output). In FIG. 3, mixdown processing is automatically performed, LR stereo signals produced by means of mixdown processing are recorded in the recording medium 22 without being reproduced. However, when the CPU 16 has reserve processing capacity, mixdown processing is automatically performed. Further, the processed stereo signals are read and reproduced from the recording medium 22 at appropriate timing, and the thus-read stereo signals are output from the speaker 26. Specifically, the CPU 16 performs mixdown processing by use of the mixer parameter selected by the user, thereby recording the stereo signals into the recording medium 22. The processed stereo signals are read and reproduced from the recording medium 22, and the second switch 20 is switched to the contact point "c," whereby the stereo signals are output from the speaker 26. The user can monitor the stereo signals having undergone mixdown processing. In this case, attention should be paid to the fact that the CPU 16 reads and reproduces the stereo signals temporarily stored in the recording medium 22 rather than reproducing in real time the stereo signals generated through mixdown processing, which has hitherto been practiced in the related art. If the user are not be satisfied with the stereo signals output from the speaker 26, the user operates the operation section 15 to thereby abort automatic execution of mixdown processing and anew select another mixer parameter stored in memory.

As mentioned above, the multitrack recorder of the present embodiment reads audio signals recorded in multiple tracks by use of a preset mixer parameter and automatically mixes down the thus-read audio signals. Since stereo signals generated without being reproduced in real time are recorded in the recording medium 22, there is no necessity to control parameters while reproducing audio signals in real time, which has hitherto been performed. Mixdown processing can therefore be performed at a higher rate. In the embodiment, it is not necessary to reproduce the stereo signals obtained through mixdown processing and output the thus-reproduced stereo signals. Consequently, since it is not necessary to control a read rate employed during mixdown processing and a write rate at which stereo signals are written into the recording medium 22 while allowing for the time required to reproduce and output the stereo signals, mixdown processing can be carried out at the maximum read/write rate that fully makes the most of the processing capacity of the CPU 16.

Figure 5:
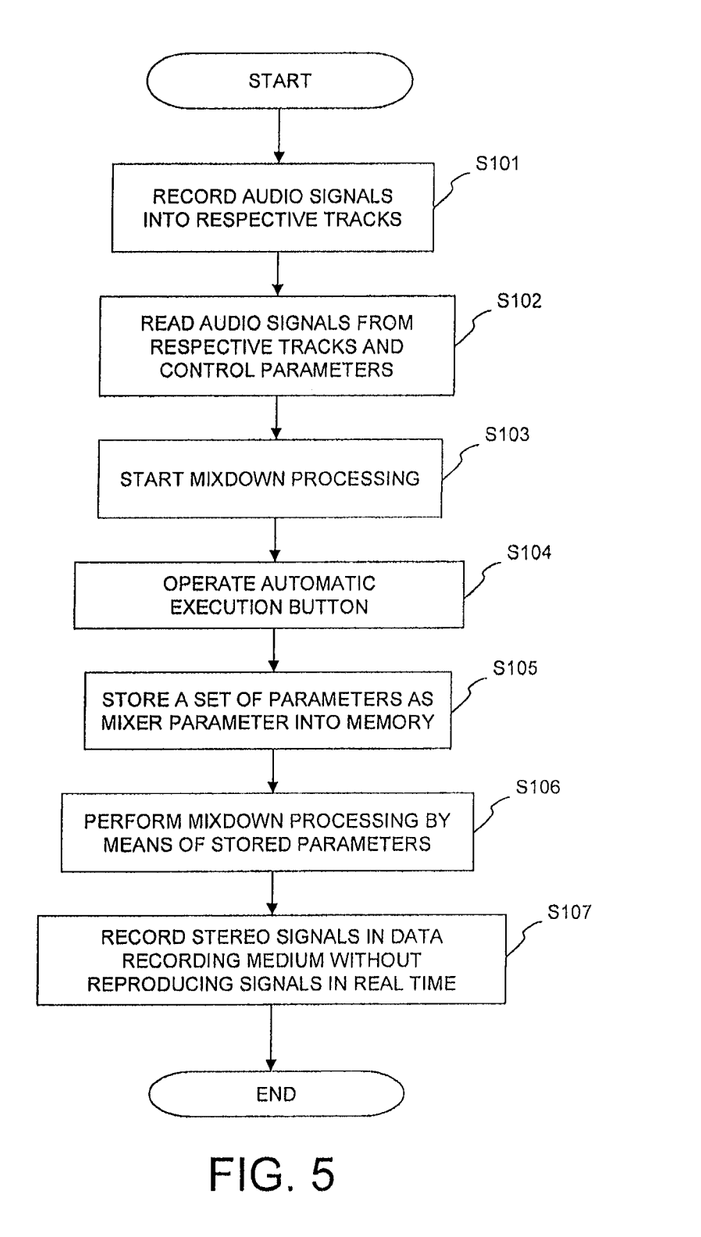
FIG. 5 is a flowchart of the embodiment.

Processing procedures of the present embodiment are summarized as shown in FIG. 5.

(1) Audio signals (music signals) are recorded in respective tracks of the recording medium 22 (S101).

(2) The audio signals are read from the respective tracks of the recording medium 22, and at least any one of Send, Pan, and Level parameters is controlled (S102).

(3) The CPU 16 starts mixdown processing (S103).

(4) The user operates an automatic execution button (S104), thereby determining each of the parameters.

(5) The CPU 16 records a set of parameters that have been thus determined as a mixer parameter into memory (S105). The mixer parameter can also be recorded in numbers.

(6) The CPU 16 performs mixdown processing by means of the thus-stored mixer parameter (S106).

(7) The stereo signals generated through mixdown processing are recorded as data in the recording medium 22 without being modified and reproduced in real time (S107).

Figure 6:
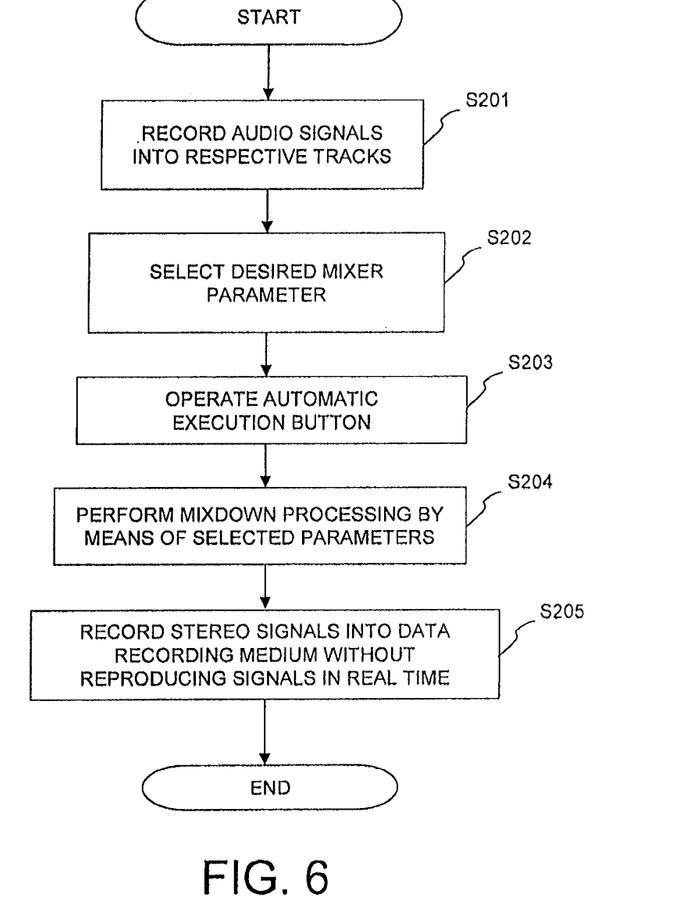
FIG. 6 is a flowchart of another embodiment.

In FIG. 5, when new audio signals are mixed down by utilization of any of the mixer parameters stored in the past, a desired mixer parameter is selected from the memory in place of processing pertaining to S102, and mixdown processing is performed by utilization of the thus-selected mixer parameter as a result of operation of the automatic execution button. FIG. 6 shows processing performed in this case. Audio signals are recorded in respective tracks (S201), and the user selects a desired mixer parameter from the memory (S202). The automatic execution button is operated (S203). The CPU 16 performs mixdown processing by use of the selected mixer parameter (S204). Stereo signals mixed down are recorded as data in the recording medium 22 without being and modified and reproduced (S205). When there are a plurality of sets of mixer parameters, the mixer parameters are assigned identification numbers and stored in the memory so as to be distinguishable from each other. The user can select a desired set of mixer parameter by use of an identification number.

Stereo signals have hitherto undergone mixdown processing while being reproduced in real time. In contrast, in the present embodiment, the stereo signals are not reproduced in real time, and data processing, like mixdown processing of digital audio signals, is solely performed. Consequently, mixdown processing can also be performed off-line.

The present embodiment provides a configuration in which a plurality of mixer parameters are recorded in memory as mixer parameters that are used when mixdown processing is automatically performed and in which the user can perform mixdown processing by arbitrarily selecting any from the plurality of mixer parameters. Because of the configuration, a certain music sound can be readily mixed down in a variety of manners. In addition, a plurality of music sounds can readily be mixed down uniformly by means of the same parameter settings.

In the present embodiment, since the stereo audio signals are not principally reproduced in real time, a time equivalent to a period of time which would be consumed by real-time reproduction can be assigned to high-load effect processing. Specifically, high-load effect processing that could not be made in time by means of real-time processing can also be performed, so that effective mixdown processing can be fulfilled.

In the related art, when reading stereo signals from the recording medium 22 involves consumption of much time, real-time processing will induce an error. In the present embodiment; however, the stereo signals will not be reproduced in real time, and hence occurrence of an error can also be prevented.

Although the switches and buttons of the operation section 15 and a screen configuration are arbitrary, it is also desirable that the operation section 15 be equipped with a function of registering (recording) settings of the parameters Pan and Level and a switch or a button for automatically implementing mixdown processing by means of registered Pan and Level parameters. As a matter of course, the operation section 15 can also have a function of displaying on a liquid crystal monitor a message to the effect that mixdown processing is being performed with previously-registered parameters. The switch or button used for automatically performing mixdown processing can simultaneously double also as a switch or button for registering a parameter. Specifically, when the user manually controls the Pan and Level parameters and operates the automatic execution switch, settings of the parameters Pan and Level achieved at that time are registered as mixer parameters in the memory. Subsequently, the audio signals of the musical composition are mixed down from the beginning by means of the registered mixer parameters, and the thus-processed signals are recorded in the recording medium 22.

What is claimed is:

1. A multitrack recorder comprising:
a multitrack recording device that records a plurality of audio signals input from an input terminal into different tracks of a recording medium;
an operation section for commanding that the audio signals recorded in multiple tracks be mixed down by use of a preset parameter to thereby be stereophonically recorded;
memory that stores the parameter which is set in the operation section according to a first operation signal from the operation section; and
a mixer configured to start an automatic execution of the mixdown process according to the first operation signal from the operation section, to read the audio signals recorded in the multiple tracks of the recording medium, to mix down the thus-generated audio signals by use of the preset parameter, to thus generate stereo signals, and records the stereo signals as audio signals in the recording device without outputting the stereo signals in real time.

2. The multitrack recorder according to claim 1, wherein the preset parameter includes parameters showing at least a balance and a sound volume.

3. The multitrack recorder according to claim 2, wherein the parameter is set in numbers, and the operation section can select any from the plurality of sets to parameters.

4. The multitrack recorder according to claim 1, wherein the mixer reads and outputs the stereo signals recorded in the recording device in a middle of mixdown processing.

5. A method for mixing down audio signals recorded in multiple tracks, the method comprising:
a step of recording audio signals in respective multiple tracks;
a step of controlling parameters used in mixdown processing;
a step of commanding automatic execution;
a step of storing into memory parameters employed at a point in time when automatic execution of the mixdown processing has been commanded;
a step of performing the mixdown processing of the audio signal by use of the parameters stored in the memory; and
a step of recording stereo signals generated by the step of performing the mixdown processing without outputting the signals in real time.

6. The method defined in claim 5, wherein the parameter includes a parameter showing at least a balance and a sound volume.

7. A method for mixing down audio signals recorded in multiple tracks, the method comprising:
a step of recording audio signals in respective multiple tracks;
a step of selecting parameters to be used in mixdown processing from memory;

a step of commanding automatic execution of the mixdown processing;

a step of performing mixdown processing by use of the selected parameters; and a step of recording, into a recording medium, stereo signals generated through mixdown processing without reproducing the stereo signals in real time.

8. The method defined in claim 7, wherein the parameter includes a parameter showing at least a balance and a sound volume.

9. The multitrack recorder according to claim 1, wherein the mixer is further configured to enable selection of a desired parameter from a plurality of parameters stored in the memory according to a second operation signal from the operation section.

* * * * *